(12) United States Patent
Guo et al.

(10) Patent No.: US 8,649,059 B2
(45) Date of Patent: Feb. 11, 2014

(54) MUTUAL OPTIMIZATION SYSTEM FOR CLASS MATRIX AND DIFFUSION WEIGHTING USED IN HALFTONE IMAGE PROCESSING TECHNIQUE

(75) Inventors: Jing-Ming Guo, Taipei County (TW); Chia-Hao Chang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 300 days.

(21) Appl. No.: 13/095,835

(22) Filed: Apr. 27, 2011

(65) Prior Publication Data

US 2011/0310437 A1 Dec. 22, 2011

(30) Foreign Application Priority Data

Jun. 22, 2010 (TW) ............................ 99120273 A

(51) Int. Cl.
*H04N 1/405* (2006.01)
(52) U.S. Cl.
USPC ..................... 358/3.04; 358/3.03; 358/3.06

(58) Field of Classification Search
USPC ........ 358/1.9, 2.1, 1.8, 3.03–3.09, 3.14, 3.21, 358/3.24, 1.15–1.17
See application file for complete search history.

(56) References Cited

U.S. PATENT DOCUMENTS

| | | | | |
|---|---|---|---|---|
| 5,469,267 A * | 11/1995 | Wang | ............................ | 358/3.21 |
| 6,710,778 B2 * | 3/2004 | Cooper | .......................... | 345/596 |
| 6,724,501 B2 * | 4/2004 | Atkins et al. | .................. | 358/3.17 |
| 8,390,890 B2 * | 3/2013 | Guo et al. | ..................... | 358/3.03 |
| 2011/0157654 A1 * | 6/2011 | Wang et al. | ..................... | 358/3.2 |

* cited by examiner

*Primary Examiner* — Thomas D Lee
*Assistant Examiner* — Stephen M Brinich
(74) *Attorney, Agent, or Firm* — Jiang Chyun IP Office

(57) ABSTRACT

A mutual optimization method for class matrix and diffusion weighting used in a halftone image processing technique and a mutual optimization system thereof are provided. In the method, a mutual optimization of a plurality of diffusion weightings and a class matrix used in a dot diffusion process is performed based on a concept of simulated annealing in order to avoid converging to local solution, so as to ensure an image quality of a halftone image generated by the dot diffusion process. Besides, since the mutual optimization method is for a hexagonal class matrix, a block effect appearing in the halftone image can be significantly reduced.

6 Claims, 5 Drawing Sheets

| | | | 13 | 4 | 3 | 1 | | |
|---|---|---|---|---|---|---|---|---|
| | 8 | 12 | 5 | 9 | 15 | 14 | | |
| | | 0 | 10 | 19 | 20 | 21 | 7 | |
| 16 | 24 | 27 | 28 | 29 | 30 | 2 | 22 |
| 26 | 32 | 25 | 18 | 11 | 34 | 23 | 31 |
| | 33 | 17 | 6 | 35 | 36 | 37 | | |
| | 38 | 39 | 40 | 41 | 42 | 43 | | |
| | | | 44 | 45 | 47 | 46 | | |

FIG. 3

| e | d | c | d | e |
|---|---|---|---|---|
| d | b | a | b | d |
| c | a | x | a | c |
| d | b | a | b | d |
| e | d | c | d | e |

FIG. 4

| CM(x−1,y−1) | CM(x,y−1) | CM(x+1,y−1) |
|---|---|---|
| CM(x−1,y) | CM(x,y) | CM(x+1,y) |
| CM(x−1,y+1) | CM(x,y+1) | CM(x+1,y+1) |

| 204 | 0 | 5 | 33 |
|---|---|---|---|
| 3 | 6 | 22 | 36 |
| 14 | 7 | 42 | 16 |
| 15 | 26 | 43 | 75 |

| 204 | 0 | 5 | 33 |
|---|---|---|---|
| 3 | 42 | 22 | 36 |
| 14 | 7 | 6 | 16 |
| 15 | 26 | 43 | 75 |

FIG. 6B

MUTUAL OPTIMIZATION SYSTEM FOR CLASS MATRIX AND DIFFUSION WEIGHTING USED IN HALFTONE IMAGE PROCESSING TECHNIQUE

CROSS-REFERENCE TO RELATED APPLICATION

This application claims the priority benefit of Taiwan application serial no. 99120273, filed Jun. 22, 2010. The entirety of the above-mentioned patent application is hereby incorporated by reference herein and made a part of this specification.

BACKGROUND OF THE INVENTION

1. Field of the Invention

The invention relates to an application of a halftone image processing technique, and more particularly to a method for optimizing class matrix and diffusion weighting used in a dot diffusion process of the halftone image processing technique and a system thereof.

2. Description of Related Art

A halftone image processing technique renders a continuous-tone image with fewer levels of color tones. Generally speaking, the halftone image processing technique has been widely applied in image output devices limited by output color levels. Printers, for example, can only output black by dotting and can output white by not dotting. Therefore, a halftone adjustment technique is needed to control the density variation of the black and white tones, so as to generate halftone images capable of simulating grayscale image effects. In more detail, since the human eye possesses effects of an optical low pass filter (OLPF), therefore outside of a distance, halftone images would appear to the human eye the visual effects similar to grayscale images.

Among halftone image processing techniques, the dot diffusion process is a well known method for generating halftone images. In short, the dot diffusion process uses a class matrix and a plurality of diffusion weightings in the diffusion regions to process the image in parallel. It is not hard to imagine that the quality of the class matrix and the diffusion weightings significantly impact the quality of the halftone images.

SUMMARY OF THE INVENTION

Accordingly, an aspect of the invention provides a mutual optimization method for class matrix and diffusion weighting used in a halftone image processing technique and a system thereof, in which the optimally generated hexagonal class matrices and the diffusion weightings can effectively ensure an image quality of the halftone image and lower a block effect therein.

An aspect of the invention provides a mutual optimization method for class matrix and diffusion weighting used in a halftone image processing technique. In the method, first a hexagonal class matrix, a plurality of diffusion weightings, a control parameter, a system temperature, and an initial value of a weighting adjustment parameter are defined. For each of the diffusion weightings, a plurality of substitute weighting candidates of the diffusion weightings are set according to the weighting adjustment parameter. A dot diffusion process cost required by each of the substitute weighting candidates are respectively calculated, and the substitute weighting candidate requiring the lowest dot diffusion process cost is selected to replace the corresponding diffusion weighting. In the method, the weighting adjustment parameter is lowered according to a decreasing ratio, and each of the diffusion weightings are repeatedly processed until the updated weighting adjustment parameter is smaller than a first threshold value. Thereafter, for each of the elements in the hexagonal class matrix, a plurality of substitute matrix candidates corresponding to the elements are defined. In accordance with the system temperature, the control parameter, and a difference value between the dot diffusion process cost required by each of the substitute matrix candidates and the dot diffusion process cost required by the hexagonal class matrix, an acceptance probability of each of the substitute matrix candidates is calculated. Moreover, in accordance with a comparison result between a uniform random number and the acceptance probability of each of the substitute matrix candidates, whether to replace the hexagonal class matrix with one of the substitute matrix candidates is determined. Next, the method resets the weighting adjustment parameter to the initial value, lowers the system temperature, and repeats the above steps for each of the diffusion weightings and each of the elements in the hexagonal class matrix, so as to determine whether to replace the values thereof, until a magnitude of image quality improvement corresponding to a dot diffusion process on a plurality of training images using the current hexagonal class matrix and the diffusion weightings is smaller than a second threshold value.

According to an embodiment of the invention, the initial value of the diffusion weightings has a Gaussian distribution in a diffusion region. Moreover, for all of the diffusion weightings, the diffusion weightings which are a same Euclidean distance from a center point of the diffusion region have the same initial value.

According to an embodiment of the invention, for each of the diffusion weightings, the step of setting the substitute weighting candidates of the diffusion weightings according to the weighting adjustment parameter includes adding the diffusion weighting with the weighting adjustment parameter so as to obtain a first value, subtracting the weighting adjustment parameter from the diffusion weighting so as to obtain a second value, and using the first value, the second value, and the diffusion weighting as the substitute weighting candidates.

According to an embodiment of the invention, the step of respectively calculating the dot diffusion process cost required by each of the substitute weighting candidates includes selecting one of the substitute weighting candidates. By using the hexagonal class matrix, the selected substitute weighting candidate, and the diffusion weightings corresponding to the unchosen substitute weighting candidates, the dot diffusion process is respectively performed on the training images, so as to obtain a plurality of halftone images corresponding to the training images. Moreover, in accordance with the halftone images, the training images, and a human visual system (HVS) model, the dot diffusion process cost required by the selected substitute weighting candidate is calculated. The method repeats the above steps until each of the substitute weighting candidates has been selected.

According to an embodiment of the invention, for each of the elements in the hexagonal class matrix, the step of defining the substitute matrix candidates corresponding to the elements includes, for each of a plurality of neighboring elements near the element, respectively swapping the locations of the element and the neighboring elements in the hexagonal class matrix, so as to generate the substitute matrix candidates corresponding to the element.

According to an embodiment of the invention, the step of calculating the acceptance probability of each of the substitute matrix candidates in accordance with the system temperature, the control parameter, and the difference value between the dot diffusion process cost required by each of the substitute matrix candidates and the dot diffusion process cost required by the hexagonal class matrix includes respectively calculating the dot diffusion process costs required by the hexagonal class matrix and each of the substitute matrix candidates. Moreover, whether the difference values between the dot diffusion process cost required by each of the substitute matrix candidates and the dot diffusion process cost required by the hexagonal class matrix are all larger than 0 is determined. When all of the difference values are larger than 0, for each of the substitute matrix candidates and in accordance with the corresponding difference value, the control parameter, and the system temperature, a specific numerical value is calculated and applied in an exponential function, so as to generate the acceptance probability of the substitute matrix candidate. Additionally, a magnitude of the acceptance probability is between a specific numerical range.

From another perspective, another aspect of the invention provides a mutual optimization system for class matrix and diffusion weighting used in a halftone image processing technique. The system includes a storage unit, a diffusion weighting optimization module, a class matrix optimization module, and a judging module. The storage unit stores a hexagonal class matrix, a plurality of diffusion weightings, a control parameter, a system temperature, and an initial value of a weighting adjustment parameter. The diffusion weighting optimization module is coupled to the storage unit. For each of the diffusion weightings, the diffusion weighting optimization module sets a plurality of substitute weighting candidates of the diffusion weightings according to the weighting adjustment parameter, respectively calculates a dot diffusion process cost required by each of the substitute weighting candidates, and selects the substitute weighting candidate requiring the lowest dot diffusion process cost to replace the corresponding diffusion weighting recorded in the storage unit. The diffusion weighting optimization module lowers the diffusion weighting parameter according to a decreasing ratio and repeats the above steps until the updated weighting adjustment parameter is smaller than a first threshold value. The class matrix optimization module is coupled to the storage unit and the diffusion weighting optimization module. After the diffusion weighting optimization module terminates optimization, for each of a plurality of elements in the hexagonal class matrix, the class matrix optimization module defines a plurality of substitute matrix candidates corresponding to the elements. Moreover, in accordance with the system temperature, the control parameter, and a difference value between the dot diffusion process cost required by each of the substitute matrix candidates and the dot diffusion process cost required by the hexagonal class matrix, the class matrix optimization module calculates an acceptance probability of each of the substitute matrix candidates. Additionally, in accordance with a comparison result between a uniform random number and the acceptance probability of each of the substitute matrix candidates, the class matrix optimization module determines whether to replace the hexagonal class matrix in the storage unit with one of the substitute matrix candidates. The judging module is coupled to the storage unit, the diffusion weighting optimization module, and the class matrix optimization module. The judging module determines whether a magnitude of image quality improvement corresponding to a dot diffusion process on a plurality of training images stored in the storage unit using the currently recorded hexagonal class matrix of the storage unit and the diffusion weightings is smaller than a second threshold value. When the magnitude of image quality improvement is not smaller than the second threshold value, the judging module resets the weighting adjustment parameter to the initial value, lowers the system temperature, and controls the diffusion weighting optimization module and the class matrix optimization module to repeatedly execute the above steps.

According to an embodiment of the invention, the initial value of the diffusion weightings has a Gaussian distribution in a diffusion region, and among the diffusion weightings, the diffusion weightings which are a same Euclidean distance from a center point of the diffusion region have the same initial value.

According to an embodiment of the invention, when the diffusion weighting optimization module sets the substitute weighting candidates of the diffusion weightings according to the weighting adjustment parameter, the diffusion weighting optimization module adds the diffusion weighting with the weighting adjustment parameter so as to obtain a first value, subtracts the weighting adjustment parameter from the diffusion weighting so as to obtain a second value, and uses the first value, the second value, and the diffusion weighting as the substitute weighting candidates.

According to an embodiment of the invention, when the diffusion weighting optimization module respectively calculates the dot diffusion process cost required by each of the substitute weighting candidates, the diffusion weighting optimization module selects one of the substitute weighting candidates, and by using the hexagonal class matrix, the selected substitute weighting candidate, and the diffusion weightings corresponding to the unchosen substitute weighting candidates, the diffusion weighting optimization module respectively performs the dot diffusion process on the training images, so as to obtain a plurality of halftone images corresponding to the training images. Moreover, in accordance with the halftone images, the training images, and a HVS model, the diffusion weighting optimization module calculates the dot diffusion process cost required by the selected substitute weighting candidate. The diffusion weighting optimization module repeats the above steps until each of the substitute weighting candidates has been selected.

According to an embodiment of the invention, for each of the elements in the hexagonal class matrix, when the class matrix optimization module defines the substitute matrix candidates corresponding to the elements, for each of a plurality of neighboring elements near the element, the class matrix optimization module respectively swaps the locations of the element and the neighboring elements in the hexagonal class matrix, so as to generate the substitute matrix candidates corresponding to the element.

According to an embodiment of the invention, when the class matrix optimization module calculates the acceptance probability of each of the substitute matrix candidates, the class matrix optimization module respectively calculates the dot diffusion process costs required by the hexagonal class matrix and each of the substitute matrix candidates, and determines whether the difference values between the dot diffusion process cost required by each of the substitute matrix candidates and the dot diffusion process cost required by the hexagonal class matrix are all larger than 0. When all of the difference values are larger than 0, for each of the substitute matrix candidates and in accordance with the corresponding difference value, the control parameter, and the system temperature, the class matrix optimization module calculates a specific numerical value and applies the specific numerical value in an exponential function, so as to generate the acceptance probability of the substitute matrix candidate. Moreover, a magnitude of the acceptance probability is between a specific numerical range.

In summary, according to embodiments of the invention, in the mutual optimization method for class matrix and diffusion weighting used in a halftone image processing technique, the hexagonal class matrix and the diffusion weightings required during the dot diffusion process are optimized cooperatively. Accordingly, convergence to a local solution during optimization is avoided, thereby enhancing the image quality of a halftone image generated by the dot diffusion process. Moreover, the hexagonal class matrix is employed in embodiments of the invention can significantly reduce the block effect from appearing in the halftone image.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view of a hexagonal class matrix according to an embodiment of the invention.

FIG. 4 is a schematic view of a plurality of diffusion weightings in a 5×5 diffusion region according to an embodiment of the invention.

FIG. 5 is a schematic view of an element and a plurality of neighboring elements in a hexagonal class matrix according to an embodiment of the invention.

FIG. 6A is a partial schematic view of a hexagonal class matrix according to an embodiment of the invention.

FIG. 6B is a partial schematic view of a substitute matrix candidate according to an embodiment of the invention.

DESCRIPTION OF EMBODIMENTS

Figure 1:
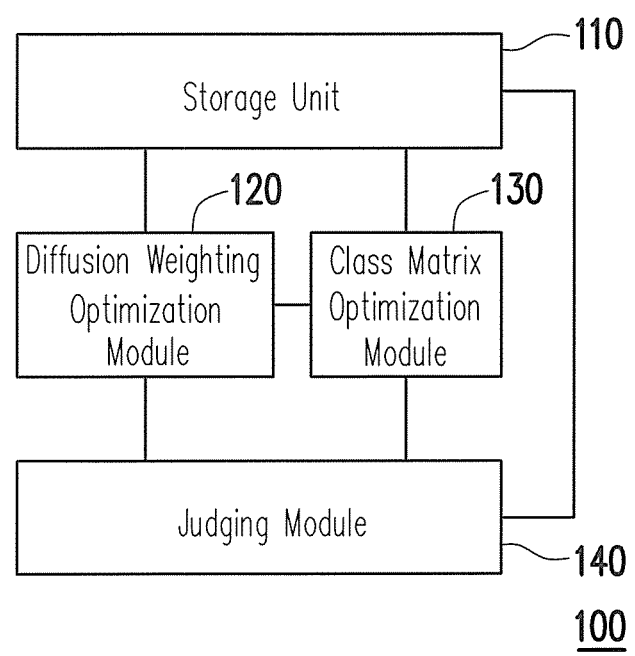
FIG. 1 is a block diagram of a mutual optimization system for class matrix and diffusion weighting used in a halftone image processing technique according to an embodiment of the invention.

FIG. 1 is a block diagram of a mutual optimization system for class matrix and diffusion weighting used in a halftone image processing technique according to an embodiment of the invention. Referring to FIG. 1, a mutual optimization system 100 includes a storage unit 110, a diffusion weighting optimization module 120, a class matrix optimization module 130, and a judging module 140.

The storage unit 110 may be a memory, a memory card, a hard disk, or other devices used for storing data. In the present embodiment, a predefined hexagonal class matrix, a plurality of diffusion weightings, a control parameter, a system temperature, and an initial value of a weighting adjustment parameter are stored in the storage unit 110.

The diffusion weighting optimization module 120 is coupled to the storage unit 110 and adapted for optimizing the diffusion weightings in the storage unit 110. The diffusion weighting optimization module 120 may be implemented by hardware devices (e.g., processors), software components, or a combination of hardware and software components. When the diffusion weighting optimization module 120 is implemented by software components, the diffusion weighting optimization module 120 may be stored in a storage media (not drawn) of the mutual optimization system 100. Moreover, the diffusion weighting optimization module 120 may be loaded for execution after the mutual optimization system 100 is activated.

The class matrix optimization module 130 is coupled to the storage unit 110 and the diffusion weighting optimization module 120. The class matrix optimization module 130 is adapted for optimizing the hexagonal class matrix in the storage unit 110 after the diffusion weighting optimization module 120 optimized the diffusion weightings. Moreover, the class matrix optimization module 130 may be implemented by hardware devices (e.g., processors), software components, or a combination of hardware and software components, for example. When the class matrix optimization module 130 is implemented by software components, the class matrix optimization module 130 may be stored in the storage media (not drawn) of the mutual optimization system 100, and be loaded for execution after the mutual optimization system 100 is activated.

The judging module 140 is coupled to the storage unit 110, the diffusion weighting optimization module 120, and the class matrix optimization module 130. The judging module 140 may be implemented by hardware devices (e.g., processors), software components, or a combination of hardware and software components. After the class matrix optimization module 130 optimized the hexagonal class matrix, the judging module 140 determines whether to repeat the optimization of the diffusion weightings and the hexagonal class matrix. When the continuing of optimization is determined, the judging module 140 controls the diffusion weighting optimization module 120 and the class matrix optimization module 130 to again perform the corresponding optimization processes in sequence.

Figure 2:
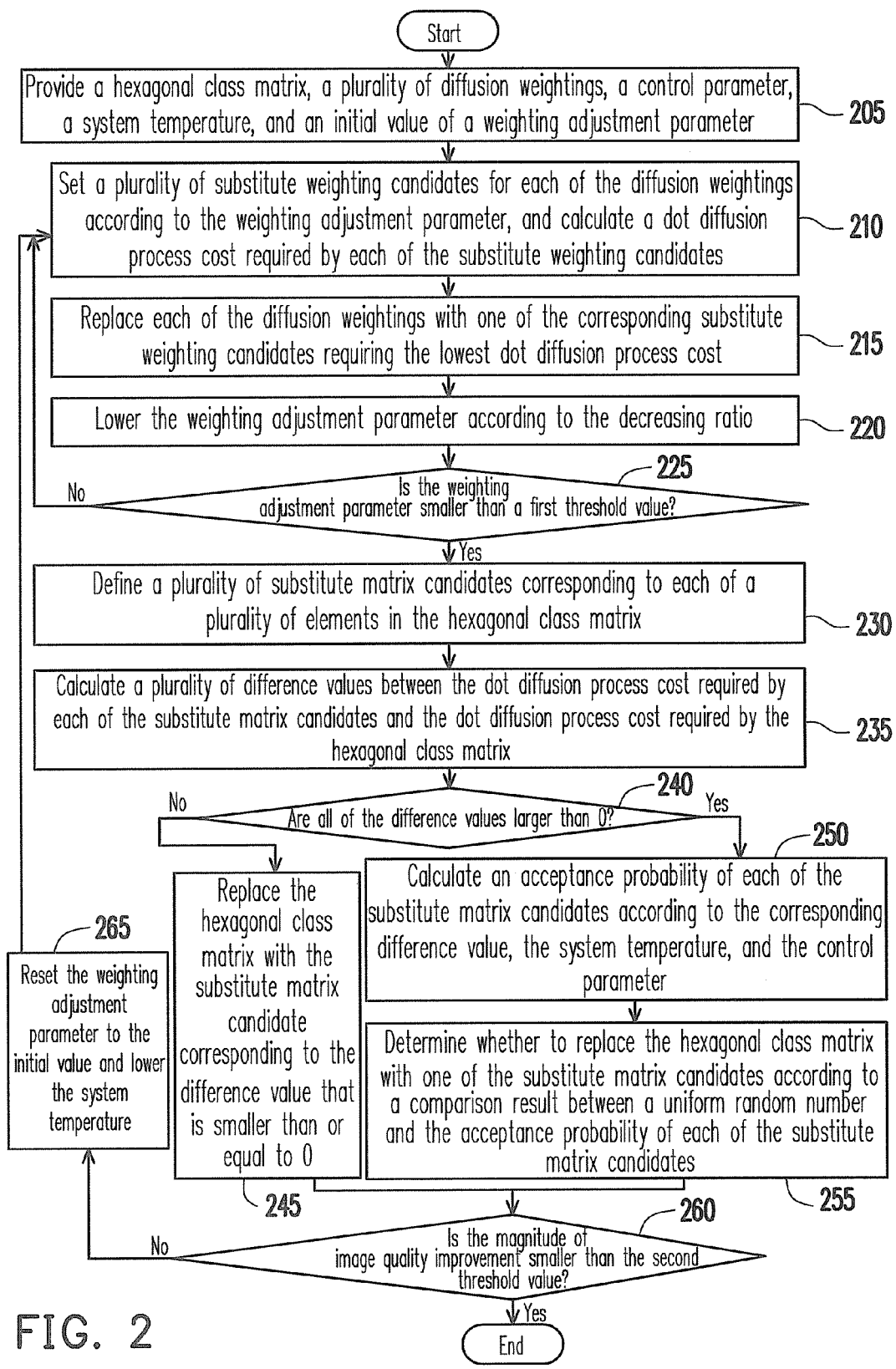
FIG. 2 is a block diagram illustrating the steps of a mutual optimization method for class matrix and diffusion weighting used in a halftone image processing technique according to an embodiment of the invention.

In order to further describe the operation of the mutual optimization system 100 in detail, another embodiment will be illustrated as follows to describe the invention. FIG. 2 is a block diagram illustrating the steps of a mutual optimization method for class matrix and diffusion weighting used in a halftone image processing technique according to an embodiment of the invention. FIGS. 1 and 2 are referenced together in the description hereafter.

Referring to FIG. 2, in a Step 205, first the storage unit 110 provides a predefined hexagonal class matrix, a plurality of diffusion weightings, a control parameter, a system temperature, and an initial value of a weighting adjustment parameter.

FIG. 3 is a schematic view of a hexagonal class matrix according to an embodiment of the invention. As shown in FIG. 3, a hexagonal class matrix 300 includes 48 elements, and a numerical range of each of the elements is between 0 to 47. Compared with the conventional 8×8 class matrix, the hexagonal class matrix 300 includes a lesser number of elements, and the elements are arranged in a shape resembling a hexagon. According to statistical analysis of laboratory results, under a same resolution, when the hexagonal class matrix is adopted to represent an output point, the required pixel points better fit the contour of the output point. Consequently, compared to matrices of other shapes, the hexagonal class matrix has a preferred coverage ratio. Moreover, an utilization ratio of a frequency band of the hexagonal class matrix is higher than matrices of other shapes.

In one embodiment of the invention, a beginning value of each of the diffusion weightings has a Gaussian distribution in a diffusion region. In another embodiment, for all of the diffusion weightings, as long as the diffusion weightings are a same Euclidean distance from a center point of the diffusion region, these diffusion weightings have the same beginning value. FIG. 4 is a schematic view of a plurality of diffusion weightings in a 5×5 diffusion region according to an embodiment of the invention. In FIG. 4, "a", "b", "c", "d", and "e" are used to represent numerical values of the diffusion weightings. As shown in FIG. 4, four diffusion weightings having a numerical value "a" are a same Euclidean distance from a center point x of the diffusion region. Similarly, four diffusion weightings having a numerical value "b" are a same Euclidean distance from the center point x of the diffusion region, and so on.

In the present embodiment, the numerical values of the control parameter and the system temperature are set, for example, according to experimental trials or experience. The initial value of the weighting adjustment parameter is 0.1, for example, although the invention is not limited thereto.

Thereafter, as shown in a Step 210, for each of the diffusion weightings, in accordance with a plurality of substitute weighting candidates of the diffusion weightings set according to the weighting adjustment parameter, the diffusion weighting optimization module 120 respectively calculates a dot diffusion process cost required by each of the substitute weighting candidates. More specifically, for each of the diffusion weightings, the diffusion weighting optimization module 120 adds the diffusion weighting with the weighting adjustment parameter so as to obtain a first value, and subtracts the weighting adjustment parameter from the diffusion weighting so as to obtain a second value. The first value, the second value, and the diffusion weighting serve as the substitute weighting candidates. For example, assume the numerical value of the diffusion weighting to be processed is DA, and the weighting adjustment parameter is σ, then the three substitute weighting candidates of this diffusion weighting are DA-σ, DA, and DA+σ, respectively.

When calculating the dot diffusion process cost required by each of the substitute weighting candidates, the diffusion weighting optimization module 120 first selects one of the substitute weighting candidates. Thereafter, by using the hexagonal class matrix, the selected substitute weighting candidate, and the diffusion weightings corresponding to the unchosen substitute weighting candidates, a plurality of training images stored in the storage unit 110 are respectively processed in the dot diffusion method, so as to obtain a plurality of halftone images corresponding to the aforesaid training images. In the present embodiment, the training images refer to natural images, and since the implementation details of the dot diffusion process is similar or the same as the conventional dot diffusion method, further descriptions are omitted herein.

Thereafter, in accordance with the halftone images, the training images, and a human visual system (HVS) model, the diffusion weighting optimization module 120 calculates the dot diffusion process cost required by the selected substitute weighting candidate. In the present embodiment, the diffusion weighting optimization module 120 calculates the dot diffusion process cost by using the following equation, for example:

$$\text{cost} = \sum_{i=0}^{P} \sum_{j=0}^{Q} \left[ \sum_{m,n \in R} \sum w_{m,n}(o_{i+m,j+n} - h_{i+m,j+n}) \right]^2$$

where a size of each of the training images is P×Q, $o_{i,j}$ represents a pixel value at a location (i,j) in the training image, $h_{i,j}$ represents a pixel value at the location (i,j) in the corresponding halftone image. Moreover, $w_{m,n}$ refers to a coefficient of the HVS model at a location (m,n). The HVS model is, for example, a least mean square (LMS) filter, and R represents the region encompassed by the LMS filter.

In the present embodiment, since the afore-described equation for calculating the dot diffusion process cost is used as the denominator to calculate a peak signal to noise ratio (PSNR) of the image, therefore, the lower the dot diffusion process cost, the higher the corresponding image quality. Accordingly, after the diffusion weighting optimization module 120 repeats the aforementioned steps to calculate the dot diffusion process cost required by each of the substitute weighting candidates, in a Step S215 thereafter, the diffusion weighting optimization module 120 uses the substitute weighting candidate having the lowest required diffusion process cost to replace the corresponding diffusion weighting in the storage unit 110.

It should be noted that, when diffusion weightings having the same Euclidean distance from the center point of the diffusion region are all set with the same numerical value, then the diffusion weighting optimization module 120 may perform the afore-described optimization steps on the diffusion weightings having the same numerical value altogether. Accordingly, an optimization processing speed is enhanced.

Thereafter, as depicted in a Step S220, the diffusion weighting optimization module 120 lowers the weighting adjustment parameter according to a decreasing ratio. In the present embodiment, the decreasing ratio is 0.1, for example. A process of lowering the weighting adjustment parameter is by obtaining a product of the current weighting adjustment parameter and the decreasing ratio, with the product serving as the updated weighting adjustment parameter.

Thereafter, as depicted in a Step S225, the diffusion weighting optimization module 120 determines whether the updated weighting adjustment parameter is smaller than a first threshold value (e.g., $10^{-3}$, although the invention is not limited thereto). As long as the adjustment parameter is not smaller than the first threshold value, the diffusion weighting optimization module 120 repeats Step 210 to Step 225, thereby further optimizing the diffusion weightings in the storage unit 110.

When the weighting adjustment parameter is smaller than the first threshold value, the diffusion weighting optimization module 120 terminates the optimization of the diffusion weightings. Thereafter, the class matrix optimization module 130 optimizes the hexagonal class matrix. More specifically, as depicted in a Step 230, for each of the elements in the hexagonal class matrix, the class matrix optimization module 130 defines a plurality of substitute matrix candidates corresponding to the elements. For example, in FIG. 5 assume that CM(x,y) represents an element in the hexagonal class matrix that is about to be processed. Then for each of the neighboring elements (e.g., elements CM(x−1,y−1), CM(x−1,y), CM(x−1,y+1), CM(x,y−1), CM(x,y+1), CM(x+1,y−1), CM(x+1,y), and CM(x+1,y+1)), the class matrix optimization module 130 respectively swaps the locations of the element CM(x,y) and each of the aforementioned neighboring elements, thereby generating eight corresponding substitute matrix candidates of the element CM(x,y). For instance, FIG. 6A is a partial schematic view of the hexagonal class matrix. After the locations of the element CM(x,y) and the element CM(x+1,y+1) are swapped by the class matrix optimization module 130, the corresponding substitute matrix candidate generated by the swap is partially depicted in FIG. 6B.

Thereafter, in a Step S235, the class matrix optimization module 130 respectively calculates a plurality of difference values between the dot diffusion process cost required by each of the substitute matrix candidates and the dot diffusion process cost required by the hexagonal class matrix. In order to calculate the difference values, the class matrix optimization module 130 needs to first calculate the dot diffusion process costs required by the hexagonal class matrix and each of the substitute matrix candidates. To be specific, the class matrix optimization module 130 first selects the hexagonal class matrix or any one of the substitute matrix candidates as a matrix to be processed (i.e., referred to as the "process matrix" hereafter). Thereafter, by using the process matrix and all of the diffusion weightings, the dot diffusion process is respectively performed on the training images in the storage unit 110, thereby obtaining the plurality of halftone images of the training images. Next, in accordance with the halftone images, the training images, and a HVS model, the class matrix optimization module 130 calculates the dot diffusion process cost required by the process matrix. Since the equation used to calculate the dot diffusion process cost is similar or the same as shown in the Step 210, further descriptions are omitted herein.

After calculating the dot diffusion process costs required by the hexagonal class matrix and each of the substitute matrix candidates by the afore-described steps, the class matrix optimization module 130 can obtain eight difference values corresponding to the eight substitute matrix candidates.

Thereafter, as depicted in a Step 240, the class matrix optimization module 130 determines whether the calculated difference values are all larger than 0. If any one of the difference values is smaller or equal to 0, then image quality is improved when the dot diffusion process is performed with the substitute matrix candidate corresponding to this difference value. Therefore, as depicted in a Step 245, the class matrix optimization module 130 directly replaces the hexagonal class matrix in the storage unit 110 with the substitute matrix candidate corresponding to the difference value that is smaller or equal to 0.

When all of the difference values are larger than 0, then as depicted in a Step 250, for each of the substitute matrix candidates, in accordance with the difference value, the control parameter, and the system temperature, the class matrix optimization module 130 calculates a specific numerical value and applies the specific numerical value in an exponential function, so as to generate the acceptance probability of the substitute matrix candidate. Moreover, the magnitude of the acceptance probability is between a specific numerical range. In the present embodiment, the class matrix optimization module 130 calculates the acceptance probability $P^{Me}$ of the substitute matrix candidate by using the following equation, for example:

$$P^{Me} = \exp\left(C \times \left(-\frac{\Delta E}{T}\right)\right)$$

where $\Delta E$ represents the difference value between the dot diffusion process cost required by the substitute matrix candidate and the dot diffusion process cost required by the hexagonal class matrix, C represents the control parameter, and T refers to the system temperature.

In a Step 255 thereafter, according to a comparison result between a uniform random number and the acceptance probability of each of the substitute matrix candidates, the class matrix optimization module 130 determines whether to replace the hexagonal class matrix with one of the substitute matrix candidates. More specifically, the class matrix optimization module 130 first generates the uniform random number in the specific numerical range. Next the acceptance probabilities of the substitute matrix candidates are ordered according to magnitude. Starting with the lowest acceptance probability, the class matrix optimization module 130 compares the uniform random number with all of the acceptance probabilities in sequence. Once the uniform random number is judged to be smaller than the acceptance probabilities, the class matrix optimization module 130 uses the substitute matrix candidate corresponding to the currently compared acceptance probability to replace the hexagonal class matrix in the storage unit 110. However, after comparison of the uniform random number with the acceptance probabilities of each of the substitute matrix candidates, if the uniform random number is larger than all of the acceptance probabilities of all the substitute matrix candidates, then the class matrix optimization module 130 maintains the hexagonal class matrix in the storage unit 110.

Thereafter in a Step 260, the judging module 140 determines whether a magnitude of image quality improvement corresponding to a dot diffusion process on the training images using the current hexagonal class matrix and the diffusion weightings is smaller than a second threshold value. The magnitude of image quality improvement is an average of the PSNR increase in all of the training images.

When the magnitude of image quality improvement is not smaller than the second threshold value, the judging module 140 determines to continue optimizing the diffusion weightings and the hexagonal class matrix. Therefore, as depicted in a Step 265, the judging module 140 resets the weighting adjustment parameter to the initial value, lowers the system temperature (e.g., using a product of the current system temperature and a temperature lowering parameter as the lowered system temperature), and controls the diffusion weighting optimization module 120 and the class matrix optimization module 130 to again perform Step 210 to Step 255, until the judging module 140 determines the magnitude of image quality improvement is smaller than the second threshold value, upon which the process flow of the method is complete. In other words, whenever each of the diffusion weighting optimization module 120 and the class matrix optimization module 130 optimizes the diffusion weightings and the hexagonal class matrix once, as long as the magnitude of the image quality improvement corresponding to the currently optimized result is not less than the second threshold value, the judging module 140 controls the diffusion weighting optimization module 120 and the class matrix optimization module 130 to again perform optimization on the diffusion weightings and the hexagonal class matrix, so as to attempt to obtain a more preferred optimized result.

In view of the foregoing, according to embodiments of the invention, in the mutual optimization method for class matrix and diffusion weighting used in a halftone image processing technique and the mutual optimization system thereof, the hexagonal class matrix and the diffusion weightings required during the dot diffusion process are optimized cooperatively. Moreover, according to specific judging mechanisms, the decision to replace the current hexagonal class matrix and the diffusion weightings can be made, thereby avoiding convergence to a local solution during optimization, and further ensuring the image quality of a halftone image generated by the dot diffusion process. Since the hexagonal class matrix is employed in the mutual optimization method, the block effect appearing in the halftone image can be significantly reduced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A mutual optimization system for class matrix and diffusion weighting used in a halftone image processing technique, comprising:

a storage unit for storing a hexagonal class matrix, a plurality of diffusion weightings, a control parameter, a system temperature, and an initial value of a weighting adjustment parameter;

a diffusion weighting optimization module coupled to the storage unit, wherein the diffusion weighting optimization module sets a plurality of substitute weighting candidates for each of the diffusion weightings according to the weighting adjustment parameter, calculates a dot diffusion process cost required by each of the substitute weighting candidates, and replaces each of the diffusion weightings recorded in the storage unit with one of the corresponding substitute weighting candidates which is requiring the lowest dot diffusion process cost, the diffusion weighting optimization module lowers the weighting adjustment parameter according to a decreasing ratio, and repeats above processes until the updated weighting adjustment parameter is smaller than a first threshold value;

a class matrix optimization module coupled to the storage unit and the diffusion weighting optimization module, wherein after the diffusion weighting optimization module terminates optimization, the class matrix optimization module defines a plurality of substitute matrix candidates corresponding to eahc of a plurality of elements in the hexagonal matrix, and in accordance with the system temperature, the control parameter, and a plurality of difference values between the dot diffusion process cost required by each of the substitute matrix candidates and the dot diffusion process cost required by the hexagonal class matrix, the class matrix optimization module calculates an acceptance probability of each of the substitute matrix candidates, and in accordance with a comparison result between a uniform random number and the acceptance probability of each of the substitute matrix candidates, the class matrix optimization module determines whether to replace the hexagonal class matrix in the storage unit with one of the substitute matrix candidates; and a judging module coupled to the storage unit, the diffusion weighting optimization module, and the class matrix optimization module, wherein the judging module determines whether a magnitude of image quality improvement corresponding to a dot diffusion process on a plurality of training images stored in the storage unit using the hexagonal class matrix and the diffusion weightings currently recorded in the storage unit is smaller than a second threshold value; when the magnitude of image quality improvement is not smaller than the second threshold value, the judging module resets the weighting adjustment parameter to the initial value, lowers the system temperature, and controls the diffusion weighting optimization module and the class matrix optimization module to repeatedly execute the above processes.

2. The system as claimed in claim 1, wherein a beginning value of each of the diffusion weightings has a Gaussian distribution in a diffusion region, and among the diffusion weightings, the diffusion weightings which are a same Euclidean distance from a center point of the diffusion region have the same beginning value.

3. The system as claimed in claim 1, wherein when the diffusion weighting optimization module sets the substitute weighting candidates for each of the diffusion weightings according to the weighting adjustment parameter, the diffusion weighting optimization module adds the diffusion weighting with the weighting adjustment parameter so as to obtain a first value, subtracts the weighting adjustment parameter from the diffusion weighting so as to obtain a second value, and uses the first value, the second value, and the diffusion weighting as the substitute weighting candidates.

4. The system as claimed in claim 1, wherein when the diffusion weighting optimization module calculates the dot diffusion process cost required by each of the substitute weighting candidates, the diffusion weighting optimization module selects one of the substitute weighting candidates, and by using the hexagonal class matrix, the selected substitute weighting candidate, and the diffusion weightings corresponding to the unchosen substitute weighting candidates, the diffusion weighting optimization module respectively performs the dot diffusion process on the training images, so as to obtain a plurality of halftone images corresponding to the training images, and in accordance with the halftone images, the training images, and a HVS model, the diffusion weighting optimization module calculates the dot diffusion process cost required by the selected substitute weighting candidate, and repeats above processes until each of the substitute weighting candidates has been selected.

5. The system as claimed in claim 1, wherein the class matrix optimization module generates the substitute matrix candidates corresponding to each of the elements in the hexagonal class matrix by respectively swapping locations of the element and each of a plurality of neighboring elements in the hexagonal class matrix.

6. The system as claimed in claim 1, wherein when the class matrix optimization module calculates the acceptance probability of each of the substitute matrix candidates, the class matrix optimization module respectively calculates the dot diffusion process costs required by the hexagonal class matrix and each of the substitute matrix candidates, and determines whether the difference values between the dot diffusion process cost required by each of the substitute matrix candidates and the dot diffusion process cost required by the hexagonal class matrix are all larger than 0, when all of the difference values are larger than 0, the class matrix optimization module calculates a specific numerical value for each of the substitute matrix candidates according to the corresponding difference value, the control parameter, and the system temperature, and applies the specific numerical value in an exponential function, so as to generate the acceptance probability of the substitute matrix candidate, wherein a magnitude of the acceptance probability is between a specific numerical range.

* * * * *